US010520023B2

(12) United States Patent
Ziegler

(10) Patent No.: US 10,520,023 B2
(45) Date of Patent: Dec. 31, 2019

(54) GUIDE CARRIAGE HAVING DEFORMATION SENSOR ON TRACK ELEMENT

(71) Applicant: Robert Bosch GmbH, Stuttgart (DE)

(72) Inventor: Mario Ziegler, Bergtheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/091,215

(22) PCT Filed: Mar. 7, 2017

(86) PCT No.: PCT/EP2017/055253
§ 371 (c)(1),
(2) Date: Oct. 4, 2018

(87) PCT Pub. No.: WO2017/174275
PCT Pub. Date: Oct. 12, 2017

(65) Prior Publication Data
US 2019/0113074 A1    Apr. 18, 2019

(30) Foreign Application Priority Data

Apr. 5, 2016 (DE) .................. 10 2016 205 575

(51) Int. Cl.
*F16C 29/06* (2006.01)
*G01L 5/00* (2006.01)
*G01M 13/04* (2019.01)

(52) U.S. Cl.
CPC ........ *F16C 29/0609* (2013.01); *F16C 29/065* (2013.01); *G01L 5/0019* (2013.01); *G01M 13/04* (2013.01)

(58) Field of Classification Search
CPC .............. F16C 29/0604; F16C 29/0609; F16C 29/0633; F16C 29/0635; F16C 29/0638;
(Continued)

(56) References Cited

U.S. PATENT DOCUMENTS 6,948,851 B2 * 9/2005 Rossteuscher ........ F16C 29/002
384/45
2007/0237435 A1 * 10/2007 Nagao ................... F16C 29/043
384/44
(Continued)

FOREIGN PATENT DOCUMENTS

DE    37 25 520        3/1988
DE    103 07 882 A1    9/2004
(Continued)

OTHER PUBLICATIONS

International Search Report corresponding to PCT Application No. PCT/EP2017/055253, dated Jun. 7, 2017 (German and English language document) (8 pages).

*Primary Examiner* — Phillip A Johnson
(74) *Attorney, Agent, or Firm* — Maginot, Moore & Beck LLP

(57) ABSTRACT

A guide carriage includes a main body, a separate track element connected to the main body, at least one carriage track, at least one deformation sensor, an evaluating device, and at least one row of endlessly revolving roller elements that roll off on an associated carriage track in a load-transmitting manner. The carriage track extends parallel to a longitudinal axis, and is positioned on the track element. The track element has at least one self-supporting section not supported on the main body and located at one end of the track element along the direction of the longitudinal axis. The at least one deformation sensor is connected to the evaluating device, positioned in a region of a respective self-supporting section of the track element, and configured to measure a deformation of the respective one of the at least one self-supporting sections of the track element.

11 Claims, 5 Drawing Sheets

(58) Field of Classification Search
CPC ............... F16C 29/064; F16C 29/0642; F16C 29/0645; F16C 29/0647; F16C 29/0652; F16C 29/0654; F16C 29/0659; F16C 29/0661; F16C 29/0664; F16C 29/0666; G01L 5/0009; G01L 5/0019; G01M 13/04
See application file for complete search history.

(56) References Cited

U.S. PATENT DOCUMENTS

| | | | | |
|---|---|---|---|---|
| 2008/0065354 | A1* | 3/2008 | Yoshioka | ............... F16C 29/00 702/183 |
| 2010/0092114 | A1* | 4/2010 | Albert | .................... F16C 29/00 384/56 |
| 2017/0356817 | A1* | 12/2017 | Bluemm | ............. F16C 29/0645 |

FOREIGN PATENT DOCUMENTS

| | | |
|---|---|---|
| DE | 20 2014 004 377 U1 | 10/2015 |
| EP | 1 433 229 | 4/2003 |
| EP | 1 443 229 A2 | 8/2004 |
| EP | 1 502 700 A1 | 2/2005 |
| EP | 1 719 992 A1 | 11/2006 |

* cited by examiner

GUIDE CARRIAGE HAVING DEFORMATION SENSOR ON TRACK ELEMENT

This application is a 35 U.S.C. § 371 National Stage Application of PCT/EP2017/055253, filed on Mar. 7, 2017, which claims the benefit of priority to Serial No. DE 10 2016 205 575.5, filed on Apr. 5, 2016 in Germany, the disclosures of which are incorporated herein by reference in their entirety.

The disclosure relates to a guide carriage and to a method of operating the same.

EP 1 719 992 B1 discloses a linear roller bearing with a guide carriage which is provided with a deformation sensor in the form of a strain gauge. The strain gauge measures the expansion of the material of the main body of the guide carriage at certain points.

DE 20 2014 004 377 U1 and DE 10 2008 019 002 A1 disclose guide carriages having separate track elements for the carriage tracks. EP 1 443 229 B1 discloses a track element having a self-supporting portion.

An advantage of the present disclosure is that the measurement signals can determine the total load acting on the guide carriage. It is also possible to determine the remaining service life of the guide carriage and/or of the linear roller bearing.

The disclosure proposes to provide at least one deformation sensor which is arranged on the guide carriage in the region of a respectively associated self-supporting portion, wherein the at least one deformation sensor can measure a deformation of the associated self-supporting portion of the track element, wherein the at least one deformation sensor is connected to an evaluation device.

The guide rail extends preferably parallel to the longitudinal axis. The guide rail has a rail track preferably for each row of rolling bodies, the associated rolling bodies rolling in a load-transmitting manner on the rail track. The track element is preferably formed separately from the main body. It is over also conceivable that the track element and the main body are formed in one piece. In the latter case, the self-supporting portion is preferably formed in that the track element projects beyond the main body. The main body consists preferably of metal and most preferably of steel. Further parts, consisting preferably of plastic, can be connected to the main body. The aforementioned deformation of the self-supporting portion is preferably a bending deformation. The track element consists preferably of steel, and it is most preferably hardened.

The description, claims, and drawings specify advantageous developments of, and improvements to, the disclosure.

Provision may be made for at least one deformation sensor to comprise a strain gauge and/or a piezoelectric film, said gauge or film being fixed to the track element in the region of the self-supporting portion, on the side directed away from the carriage track. Such a deformation sensor is particularly space-saving.

Provision may be made for at least one deformation sensor to comprise a proximity sensor, which can measure a spacing between the self-supporting portion of the track element and the main body. A proximity sensor can measure the deformation of the self-supporting portion particularly precisely. The proximity sensor can operate capacitively, inductively, optically or mechanically.

Provision may be made for the proximity sensor to be fastened optionally on the main body or on the track element.

Provision may be made for the track element to have at least two self-supporting portions, which are arranged at opposite ends of the track element, as seen in the direction of the longitudinal axis, wherein at least one carriage track of said track element is assigned two deformation sensors, which are arranged at opposite ends of the track element, as seen in the direction of the longitudinal axis. It is thus possible to determine the total load acting on the guide carriage even when said load acts eccentrically on the guide carriage or when it acts on the guide carriage in the form of a torque. In both cases, different individual loads act on the load-bearing rolling bodies in the guide carriage. These individual loads can be determined with reference to the measurement signals from the deformation sensors, which will be explained in more detail hereinbelow. The guide carriage has preferably a plurality of rows, at most preferably four rows, of rolling bodies, wherein each carriage track is assigned two deformation sensors, which are arranged at opposite ends of the relevant track element, as seen in the direction of the longitudinal axis.

Provision may be made for the guide carriage to be provided with a distance sensor, which, by sensing a measuring scale on the guide rail, can determine a relative positioning between the guide carriage and the guide rail, wherein the distance sensor is connected to the evaluation device. This makes it possible to determine the distance covered by the guide carriage, which is required for the determination of the remaining service life of the linear roller bearing.

Also proposed is a method of operating a guide carriage according to the disclosure, wherein the two deformation sensors measure the deformation of the two self-supporting portions, which are assigned to a carriage track, wherein the aforementioned deformations are used to determine a respective first individual load acting on the rolling bodies which are critical in each case for the relevant deformation, wherein the first individual loads are used to determine a number of second individual loads acting on the rolling bodies arranged between the critical rolling bodies, wherein the first and the second individual loads are used to determine a first total load. The critical rolling bodies are preferably those rolling bodies of which the center points are arranged in the self-supporting portion. It may be the case here that only a single rolling body is critical for the deformation, namely that rolling body of which the center point is spaced apart by the smallest distance from the abutment portion, along which the relevant track element is supported on the main body. It is preferably the case, however, that the track element is designed such that there are a plurality of rolling bodies performing a load-bearing function in the region of the self-supporting portion, wherein the rolling body mentioned above is subjected to the highest loading. The loading acting on the load-bearing rolling bodies of a self-supporting portion can be combined mathematically to form a single first individual load. The first total load is preferably the sum of all the first and second individual loads. It is also possible, however, for the first total load to be the torque transmitted by the relevant rolling bodies.

Provision may be made for the guide carriage to have a plurality of, preferably four, rows of rolling bodies, wherein the aforementioned first total load is determined for each row of rolling bodies, wherein the first total loads are used to calculate a second total load, the first total loads being added vectorially, with account being taken of a pressure angle of the associated row of rolling bodies. Accordingly, the second total load is equal to the exterior load which acts on the guide carriage. The present disclosures can determine all six components of the second total load, namely two force components and three torque components. Approximately no force will be transmitted by the rolling bodies here as seen in the movement direction of the guide carriage.

Provision may be made for the distance covered by the guide carriage to be measured, wherein the distance covered and the first total loads and/or the second total load are used to determine the remaining service life of the guide carriage. For the purpose of determining the remaining service life, reference is made to the formulae in the relevant linear-roller-bearing catalogs. The distance covered is determined preferably by means of the distance sensor mentioned above. It is also conceivable, however, for the guide carriage to be in drive connection with a motor which is equipped with a rotary encoder, the distance covered being determined by means of the rotary encoder. It is further conceivable for the guide carriage to be provided with an acceleration sensor, the distance covered being determined by two-fold integration of the acceleration measured.

Protection is also claimed for a guide carriage of which the evaluation device is designed to implement one of the methods above.

Of course, the features which have been mentioned above, and those which are yet to be explained hereinbelow, can be used not just in the respectively given combination, but also in other combinations, or in their own right, without departing from the context of the present disclosure.

BRIEF DESCRIPTION OF THE DRAWINGS

The disclosure will be explained in more detail hereinbelow with reference to the accompanying drawings, in which.

DETAILED DESCRIPTION

Figure 1:
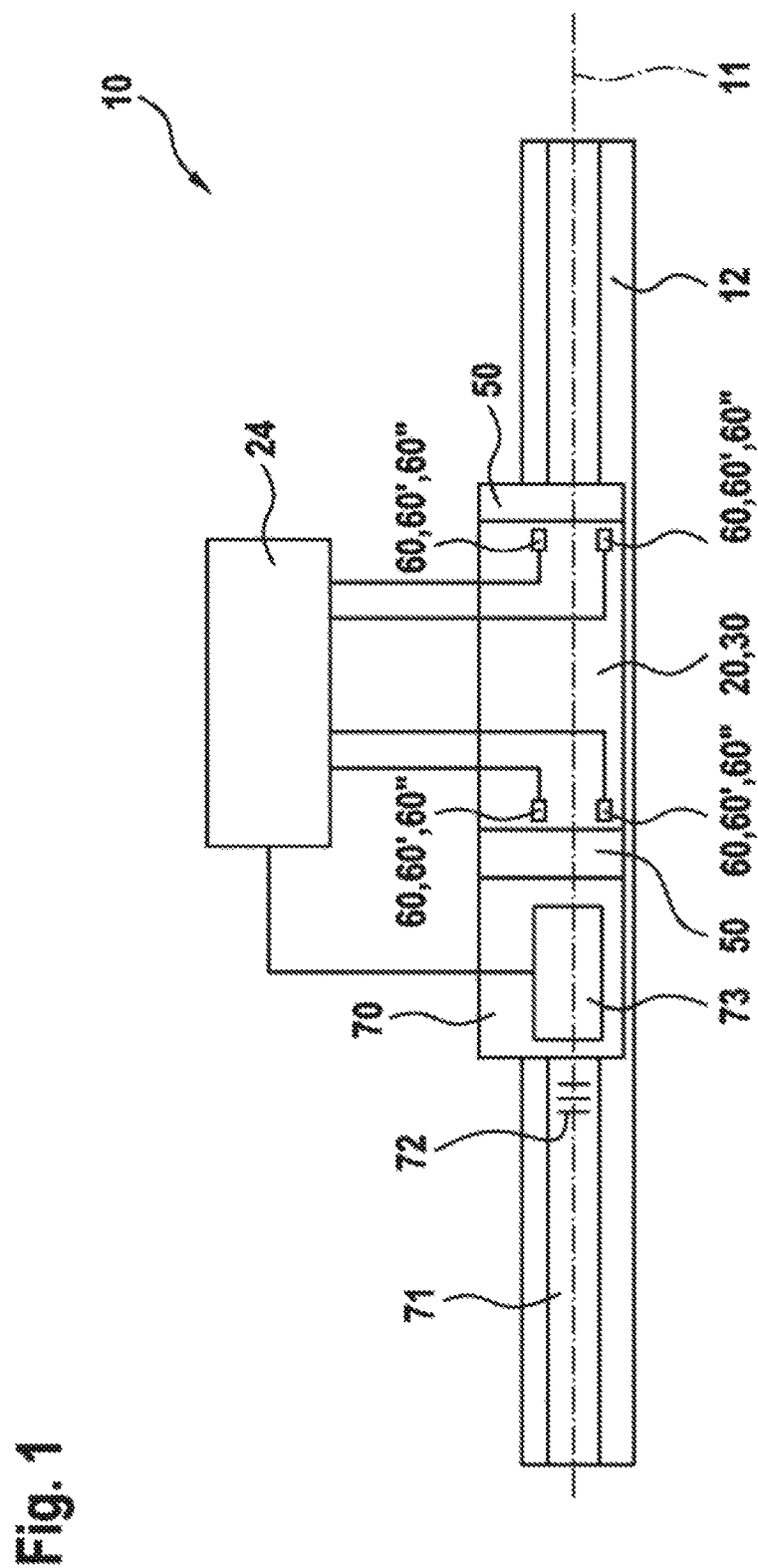
FIG. 1 shows a roughly schematic side view of a linear roller bearing with a guide carriage, according to a first embodiment of the disclosure.

FIG. 1 shows a roughly schematic side view of a linear roller bearing 10 with a guide carriage 20, according to a first embodiment of the disclosure. The linear roller bearing 10 comprises a guide rail 12, on which a guide carriage 20 is mounted such that it can be moved in the direction of the longitudinal axis 11. The guide rail 12 extends with a constant cross-sectional shape (see FIG. 6) in the direction of the longitudinal axis 11. A measuring scale 71 can be fitted on a side surface of the guide rail 12, and extends over the entire length of the guide rail 12. The measuring scale 71 can be designed, for example, in a manner corresponding to EP 1 052 480 B1. Accordingly, it is formed by a band of sheet steel, which is provided with markings 72 in the form of identical rectangular through-passages. In contrast to the illustration in FIG. 1, the markings 72 are distributed over the entire length of the measuring scale, the distribution being at constant intervals.

The guide carriage 20 comprises a main body 30, which consists preferably of unhardened steel. A separate end cap 50, consisting preferably of plastic, is fastened at each of the two opposite ends of the main body 30, as seen in the direction of the longitudinal axis 11. A distance-measuring device 70 comprising a distance sensor 73, constructed for example in accordance with EP 1 164 358 B1, may be fastened on one of the end caps 50. The distance sensor 73 can have at least one transmitter coil and at least one receiver coil, which are arranged such that the inductive coupling between the receiver coil and the transmitter coil is dependent on the positioning of the distance sensor 73 relative to the measuring scale 71. The distance sensor 73 is connected to an evaluation device 24, which has preferably at least one analog/digital converter and at least one digital data-processing component, for example a microprocessor or an FPGA. The evaluation device 24 can be arranged within the distance-measuring device 70.

Figure 3:
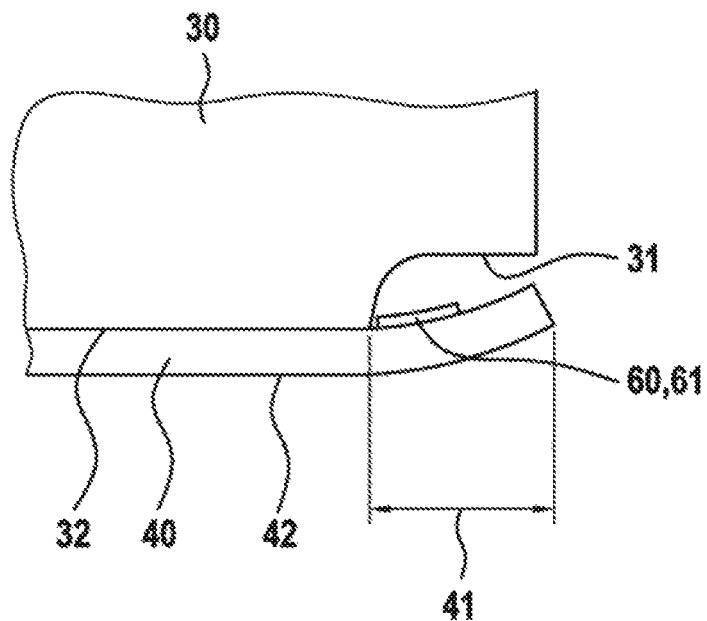
FIG. 3 shows a roughly schematic sectional detail view of the deformation sensor of the linear roller bearing according to FIG. 1.
Figure 4:
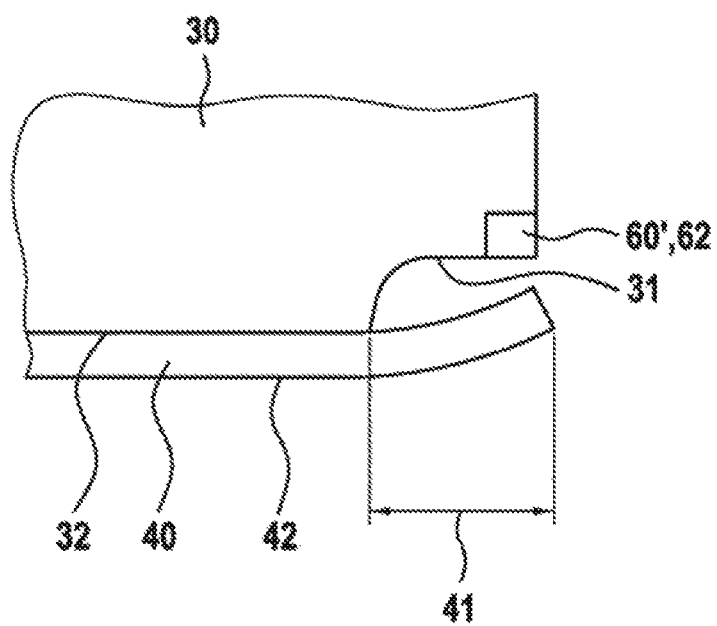
FIG. 4 shows a view of a deformation sensor corresponding to FIG. 3, this time according to a second embodiment of the disclosure.
Figure 5:
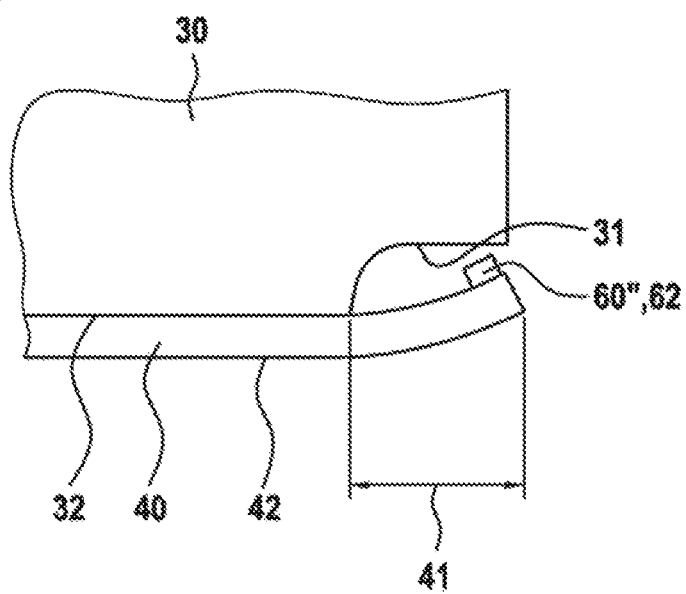
FIG. 5 shows a view of a deformation sensor corresponding to FIG. 3, this time according to a third embodiment of the disclosure.

FIG. 1 also depicts, roughly schematically, the arrangement of the deformation sensors 60; 60'; 60" according to the disclosure, these being described more specifically with reference to FIGS. 3 to 5. Each of the two opposite sides of the guide rail 12 have located on them for example two carriage tracks (no. 42 in FIG. 6), which are each assigned two deformation sensors 60; 60'; 60", which are arranged at opposite ends of the relevant carriage track or of the corresponding track element (no. 40 in FIG. 6), as seen in the direction of the longitudinal axis 11. All the deformation sensors 60; 60'; 60" are connected to the evaluation device 24.

Figure 2:
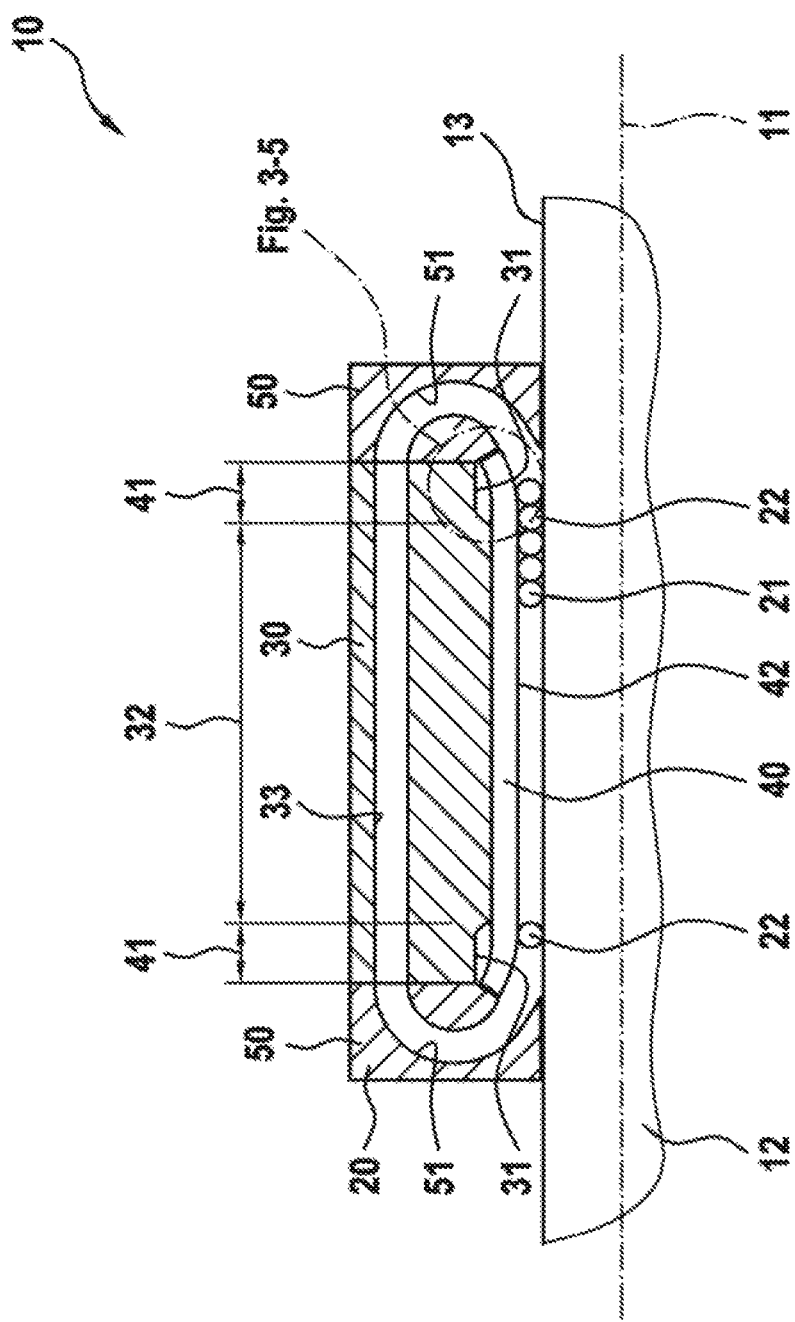
FIG. 2 shows a roughly schematic longitudinal section of the linear roller bearing according to FIG. 1.

FIG. 2 shows a roughly schematic longitudinal section of the linear roller bearing 10 according to FIG. 1. The section plane has been positioned such that it runs through the center points of the rolling bodies 21 of a row of endlessly circulating rolling bodies 21. The rolling bodies 21 circulate in an endless circulation channel made up of a load-bearing region, a return channel 33 and two deflecting channels 51. In contrast to the illustration in FIG. 2, more or less the entire circulation channel is filled with rolling bodies 21. The load-bearing region is delimited by a rail track 13 on the guide rail 12 and by a carriage track 42 on the track element 40 of the guide carriage 20. The rolling bodies 21 roll in a load-transmitting manner between said tracks 13; 42, wherein they are installed there preferably under prestressing. The carriage track 42, the rail track 13 and the return channel 33 run rectilinearly and parallel to the longitudinal axis 11. The two curved deflecting channels 51 connect the load-bearing region to the return channel 33, and therefore the rolling bodies 21 can circulate endlessly.

The track element 40 consists preferably of hardened steel, wherein it butts in a load-transmitting manner against the main body 30 along an abutment portion 32. It can butt here directly against the main body 30, wherein it is pushed against the abutment portion 32, and retained there in a frictionally fitting manner, by the prestressing force of the rolling bodies 21. It is also conceivable, however, for the track element 40 to be connected integrally, for example adhesively bonded, to the main body 30. A recess 31 is provided on the main body 30 at each of the two opposite ends of the track element 40, as seen in the direction of the longitudinal axis 11, and therefore the track element 40 has a self-supporting portion 41 there, which does not butt against the main body 30. As an alternative, or in addition, a comparable recess (not illustrated) can be provided on the track element 40. It is further conceivable for the track insert 40 to project beyond the main body 30, in the direction of the longitudinal axis 11, in order to form the self-supporting portion.

In the region of the self-supporting portion, which is the subject matter of EP 1 443 229 B1, the track insert 40 is bent by the force of the rolling bodies 21. It has been found here that this bending is caused predominantly by the critical rolling body, which is denoted by reference sign 22 in FIG. 2. This is that rolling body 22 of which the center point is arranged in the self-supporting portion 41, wherein the aforementioned center point is, at the same time, spaced apart by the smallest distance from the abutment portion 32. The rest of the rolling bodies in the self-supporting portion 41 can likewise contribute to the deformation, albeit to a less pronounced extent. The present disclosure is based on the finding that the magnitude of the deformation of the self-supporting portion 41 is a measure of the first individual load acting on the critical rolling body or bodies 22. Furthermore, tests carried out by the applicant have shown that the self-supporting portions 41 result in the load-bearing rolling bodies 21 exhibiting an extremely uniform load distribution, and therefore the first individual loads, which act on the critical rolling body or bodies 22, can determine the second individual loads, which act on the rest of the load-bearing rolling bodies 21. The rest of the load-bearing rolling bodies 21 are located between the critical rolling bodies 22. Within the context of an approximation, the second individual load is between 70% and 130% of the value of the first individual loads interpolated linearly onto the respective rolling body 21 in question. The lower limit is critical in particular in cases where a significant load-bearing function is performed in the self-supporting portion 41 by a plurality of rolling bodies of which the loading is combined mathematically to give a single first individual load. The upper limit is critical in particular in cases where there is only a single critical rolling body performing a load-bearing function in each case. FEM calculations can achieve more precise results. The number of load-bearing rolling bodies between the critical rolling bodies 22 is equal to the length of the abutment portion 32 divided by the diameter of the rolling bodies 21. Of course, this number is a whole number, which can vary by one when the guide carriage is moving. For the sake of simplicity, the unrounded value or the rounded value is used in the load calculation.

FIG. 3 shows a roughly schematic sectional detail view of the deformation sensor 60 of the linear roller bearing according to FIG. 1. The position of the sectional detail view is denoted by a dash-dotted line in FIG. 2, the section planes of FIGS. 2 and 3 being the same. FIG. 3 illustrates exclusively the main body 30, the track element 40 and the deformation sensor 60. The deformation sensor 60 is designed in the form of a strain gauge 61, which is adhesively bonded to the track element 40 in the region of the self-supporting portion 41, on the side directed away from the carriage track 42. The strain gauge 61 is arranged preferably at the location of the greatest amount of bending-induced material compression, that is to say as close as possible to the abutment portion 32.

Instead of the strain gauge 61, it is also possible to use a piezoelectric film. Within the context of the present disclosures, a piezoelectric film can also measure static loading of the guide carriage, as long as the latter is moving. The moving rolling bodies then give rise to expansion and/or compression of the piezoelectric film, said expansion and/or compression changing over time, and this therefore supplies a suitable measuring voltage.

FIG. 4 shows a view of a deformation sensor 60' corresponding to FIG. 3, this time according to a second embodiment of the disclosure. The deformation sensor 60' is a proximity sensor 62, which is fastened on the main body 30 in the region of the self-supporting portion 41, wherein it is arranged opposite to the track element 40. The proximity sensor 62 can measure a spacing between the self-supporting portion 41 of the track element 40 and the main body 30. The proximity sensor 62 can operate, for example, capacitively, inductively, optically or mechanically. It is arranged preferably at the location at which the track element 40 covers the greatest distance as a result of bending, that is to say at the outermost free end of the track element 40.

FIG. 5 shows a view of a deformation sensor 60" corresponding to FIG. 3, this time according to a third embodiment of the disclosure. In contrast to FIG. 4, the deformation sensor 60", in the form of a proximity sensor 62, is now fastened on the track element 41, to be precise on the side which is directed toward the main body 30. Otherwise, the same applies as for FIG. 4.

Figure 6:
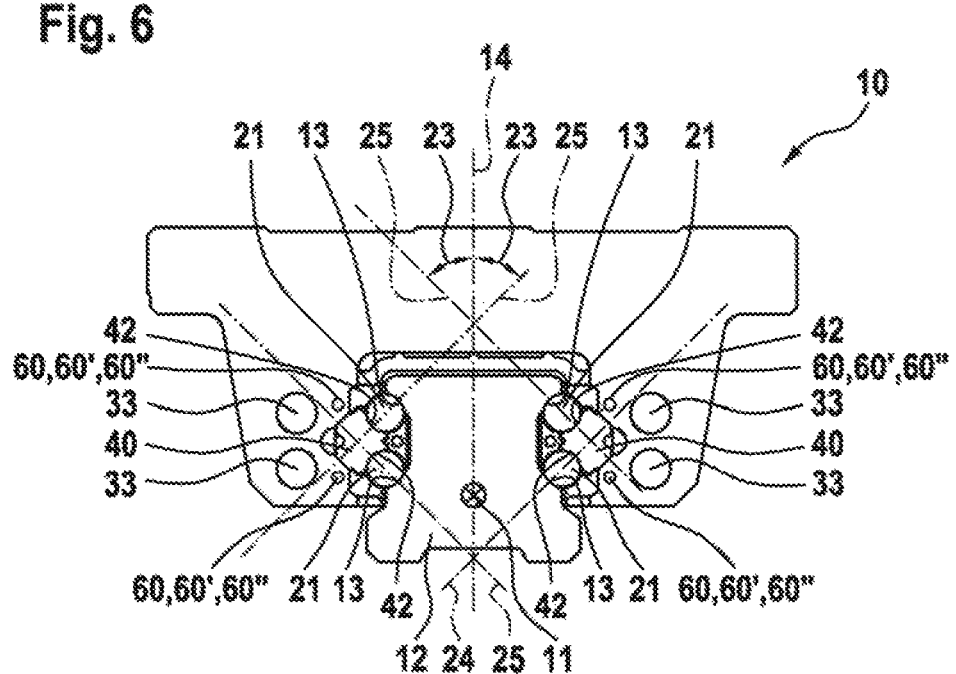
FIG. 6 shows a cross section of the linear roller bearing according to FIG. 1.

FIG. 6 shows a cross section of the linear roller bearing 10 according to FIG. 1. The guide carriage 20 has a total of four rows of spherical rolling bodies 21. The corresponding pressure lines 25, taken together, are in the shape of the letter O, this therefore being referred to as an O arrangement. However, the present disclosure can also be used for a linear roller bearing 10 in which the rolling bodies are in an X arrangement. A total of two carriage tracks 42 are provided on each track element 40, wherein the track element butts in a frictionally fitting manner against the main body 30. The guide carriage 20 is of U-shaped design, as seen in cross section, and it engages around the guide rail 12. However, the present disclosure can also be used for U-shaped guide rails which engage around the guide carriage.

In FIG. 6, the position of the deformation sensors 60; 60'; 60" in relation to the track element 40 is denoted in each case by a circle. Of course, rather than being arranged in the section plane of FIG. 6, the deformation sensors 60; 60'; 60" are arranged at the location illustrated in FIGS. 3 to 5, as seen in the direction of the longitudinal axis 11. Transversely to the longitudinal axis 11, the deformation sensors 60; 60'; 60" are arranged on that side of the track element 40 which is directed away from the associated carriage track 42, as seen in the direction of the respective pressure line 25. Accordingly, each track element 40 is assigned four deformation sensors 60; 60'; 60", namely two each at both longitudinal ends.

The angle between the pressure lines 25 and the symmetry plane 14 of the linear roller bearing 10 is referred to as the pressure angle 23. It is required within the context of calculating the second total load.

Figure 7:
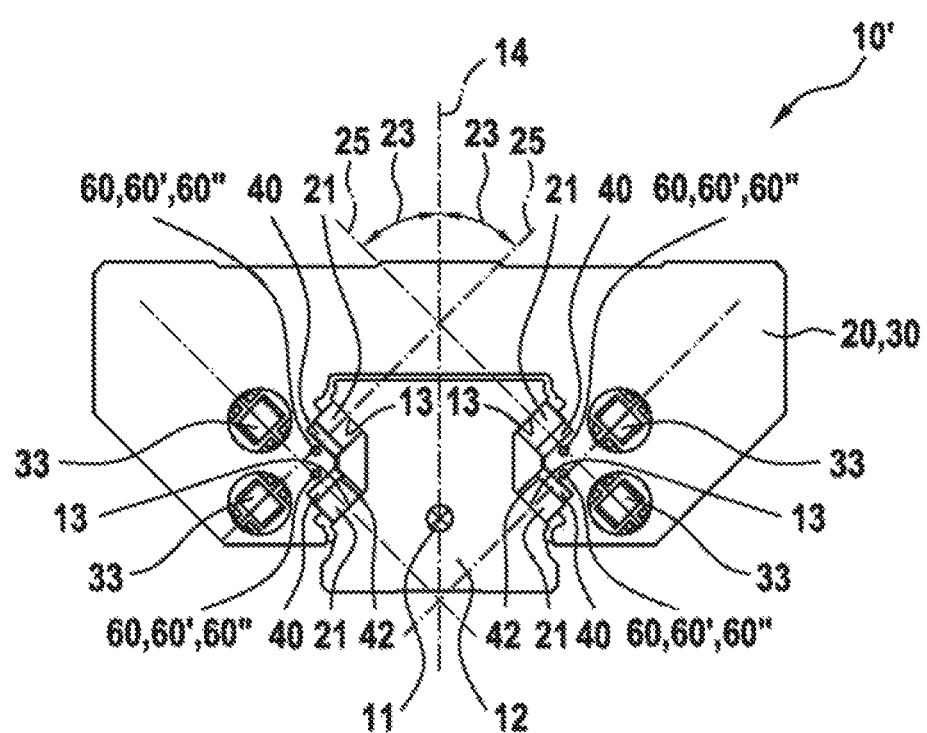
FIG. 7 shows a cross section of a linear roller bearing with a guide carriage corresponding to FIG. 6, this time according to a fourth embodiment of the disclosure.

FIG. 7 shows a cross section of a linear roller bearing 10' with a guide carriage 20 corresponding to FIG. 6, this time according to a fourth embodiment of the disclosure. In contrast to FIG. 6, the linear roller bearing 10' has rolling bodies 21 in the form of rollers, wherein each carriage track 42 is assigned a separate track element 40, which is adhesively bonded to the main body 30. In a manner analogous to FIG. 6, the position of the deformation sensors 60; 60'; 60" is denoted in each case by a circle.

LIST OF REFERENCE SIGNS

10 Linear roller bearing (first embodiment)
10' Linear roller bearing (fourth embodiment)

11 Longitudinal axis
12 Guide rail
13 Rail track
14 Symmetry plane
20 Guide carriage
21 Rolling body
22 Critical rolling body
23 Pressure angle
24 Evaluation device
25 Pressure line
30 Main body
31 Recess
32 Abutment portion
33 Return channel
40 Track element
41 Self-supporting portion
42 Carriage track
50 End cap
51 Deflecting channel
60 Deformation sensor (first embodiment)
60' Deformation sensor (second embodiment)
60" Deformation sensor (third embodiment)
61 Strain gauge
62 Proximity sensor
70 Distance-measuring device
71 Measuring scale
72 Marking
73 Distance sensor

The invention claimed is:

1. A guide carriage for use with an elongate guide rail, comprising:
a main body;
a track element connected to the main body, and including at least one self-supporting portion located at a respective end of the track element as viewed in a direction of a longitudinal axis, wherein the at least one self-supporting portion is not supported on the main body;
at least one carriage track positioned on the track element and extending parallel to the longitudinal axis;
at least one row of endlessly circulating rolling bodies configured to roll in a load-transmitting manner on an associated one of the at least one carriage track;
an evaluation device; and
at least one deformation sensor positioned on the guide carriage in a region of the at least one associated self-supporting portion, wherein the at least one deformation sensor is configured to measure a deformation of the at least one self-supporting portion of the track element, and wherein the at least one deformation sensor is connected to the evaluation device.

2. The guide carriage as claimed in claim 1, wherein:
the at least one deformation sensor includes at least one of a strain gauge and a piezoelectric film, and
the at least one of the strain gauge and piezoelectric film is fixed to the track element in the region of the at least one self-supporting portion, on a side of the track element directed away from the at least one carriage track.

3. The guide carriage as claimed in claim 1, wherein the at least one deformation sensor includes a proximity sensor configured to measure a spacing between the at least one self-supporting portion of the track element and the main body.

4. The guide carriage as claimed in claim 3, wherein the proximity sensor is fastened on the main body or on the track element.

5. The guide carriage as claimed in claim 1, further comprising:
a distance sensor configured to sense a measuring scale located on the guide rail, and to determine a relative positioning between the guide carriage and the guide rail with reference to the sensed measuring scale, wherein the distance sensor is connected to the evaluation device.

6. The guide carriage as claimed in claim 1, wherein:
the guide carriage includes at least two deformation sensors;
the track element includes at least two self-supporting portions located at opposite ends of the track element from each other, as seen in the direction of the longitudinal axis, and
the at least one carriage track of the track element is assigned two of the at least two deformation sensors positioned at the opposite ends of the track element from each other, as seen in the direction of the longitudinal axis.

7. The guide carriage as claimed in claim 6, wherein the evaluation device configured to:
measure, using the two deformation sensors of the assigned carriage track, a deformation of the at least two self-supporting portions;
determine, with reference to the measured deformation, first individual loads acting on rolling bodies from amongst the at least one row of endlessly circulating rolling bodies which are critical for the measured deformation;
determine, with reference to the first individual loads on the critical roller bodies, second individual loads acting on the rolling bodies located between the critical rolling bodies; and
determine, with reference to the first individual loads and to the second individual loads, a first total load.

8. A method of operating a guide carriage, comprising:
measuring, using two deformation sensors a deformation of two self-supporting portions of a track element of a guide carriage, which are assigned to a carriage track, wherein:
the two self-supporting portions of the track element are located at opposite ends of the track element from each other, as viewed in a direction of a longitudinal axis;
the guide carriage further includes a main body;
the two self-supporting portions of the track element are not supported on the main body;
the guide carriage further includes at least one carriage track positioned on the track element and extending parallel to the longitudinal axis;
the guide carriage further includes at least one row of endlessly circulating rolling bodies configured to roll in a load-transmitting manner on an associated one of the at least one carriage track; and
the two deformation sensors are each positioned on the guide carriage in a region of a respective one of the two self-supporting portions of the track element, and are connected to an evaluation device;
determining, with reference to the measured deformation, first individual loads acting on rolling bodies from amongst the at least one row of endless circulating rolling bodies which are critical for the measured deformation;

determining, with reference to the first individual loads on the critical roller bodies, second individual loads acting on rolling bodies located between the critical rolling bodies; and determining, with reference to the first individual loads and to the second individual loads, a first total load.

9. The method as claimed in claim 8, wherein:

the guide carriage includes a plurality of rows of endlessly circulating rolling bodies; and the method further comprises:

determining a respective first total load for each of the plurality of rows of endlessly circulating rolling bodies calculating, with reference to the determined the first total loads, a second total load, wherein the first total loads are added vectorially, with reference to a pressure angle associated with each row of the plurality of rows of endlessly circulating rolling bodies.

10. The method as claimed in claim 9, further comprising:

measuring a distance covered by the guide carriage; and determining, with reference to the distance covered and to at least one of the first total loads and the second total load, a remaining service life of the guide carriage.

11. The method as claimed in claim 9, wherein the guide carriage includes four rows of endlessly circulating rolling bodies.

* * * * *

UNITED STATES PATENT AND TRADEMARK OFFICE
CERTIFICATE OF CORRECTION

PATENT NO. : 10,520,023 B2  
APPLICATION NO. : 16/091215  
DATED : December 31, 2019  
INVENTOR(S) : Mario Ziegler Page 1 of 1

It is certified that error appears in the above-identified patent and that said Letters Patent is hereby corrected as shown below:

In the Claims

In Claim 1, at Column 7, Lines 46-47, delete the word "associated" between the words "one" and "self-supporting".

In Claim 8, at Column 8, Line 62, delete the word "endless" and replace it with the word --endlessly--.

Signed and Sealed this
Twelfth Day of May, 2020

Andrei Iancu
*Director of the United States Patent and Trademark Office*